United States Patent
Cheng

(10) Patent No.: US 10,551,703 B2
(45) Date of Patent: Feb. 4, 2020

(54) LIQUID CRYSTAL SCREEN AND DISPLAY DEVICE

(71) Applicant: Boe Technology Group Co., Ltd., Beijing (CN)

(72) Inventor: Hongfei Cheng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 212 days.

(21) Appl. No.: 14/907,053

(22) PCT Filed: Jul. 17, 2015

(86) PCT No.: PCT/CN2015/084357
§ 371 (c)(1),
(2) Date: Jan. 22, 2016

(87) PCT Pub. No.: WO2016/138721
PCT Pub. Date: Sep. 9, 2016

(65) Prior Publication Data
US 2016/0377942 A1    Dec. 29, 2016

(30) Foreign Application Priority Data
Mar. 4, 2015 (CN) .................... 2015 2 0126781 U

(51) Int. Cl.
G02F 1/1362 (2006.01)
G02F 1/1335 (2006.01)
G02F 1/1343 (2006.01)

(52) U.S. Cl.
CPC .. G02F 1/136286 (2013.01); G02F 1/133512 (2013.01); G02F 1/134327 (2013.01); *G02F 2001/134345* (2013.01)

(58) Field of Classification Search
CPC ......... G02F 1/136286; G02F 1/134327; G02F 1/133512
See application file for complete search history.

(56) References Cited

U.S. PATENT DOCUMENTS 6,567,144 B1 * 5/2003 Kim ................... G02F 1/133753
349/128
6,972,812 B2 * 12/2005 Lu ......................... G02F 1/1393
349/110

(Continued)

FOREIGN PATENT DOCUMENTS

CN    101131522    2/2008
CN    101339337    1/2009

(Continued)

OTHER PUBLICATIONS

International Search Report and Written Opinion from PCT/CN15/84367 dated Nov. 30, 2015.

*Primary Examiner* — Dung T Nguyen
(74) *Attorney, Agent, or Firm* — Calfee, Halter & Griswold LLP

(57) ABSTRACT

A liquid crystal screen and a display device that prevents light leakage caused by non-uniformity of the electric field of the sub-pixel electrode. The liquid crystal screen comprises a first substrate comprised of first leads and second leads that cross each other, and a liquid crystal screen comprised of a plurality of display areas. Each display area corresponds to an area between two adjacent first leads and two adjacent second leads, and each display area is comprised of two sub-pixels. The liquid crystal screen further comprises a black matrix, which has a plurality of openings, each at a position corresponding to each display area, and comprised of protrusions extending into each opening. The liquid crystal screen of the present invention can effectively prevent light leakage caused by non-uniformity of the electric field of the sub-pixel electrode, and can increase contrast of the liquid crystal screen, thereby improving display effect.

18 Claims, 4 Drawing Sheets

(56) References Cited

U.S. PATENT DOCUMENTS

| | | | |
|---|---|---|---|
| 7,710,523 B2* | 5/2010 | Nakanishi et al. | ............................ G02F 1/136259 349/38 |
| 7,903,221 B2* | 3/2011 | Taguchi | ............ G02F 1/133707 349/144 |
| 8,400,597 B2* | 3/2013 | Morinaga et al. | ..... G09G 3/003 349/15 |
| 2003/0128312 A1 | 7/2003 | Lu et al. | |
| 2007/0279542 A1* | 12/2007 | Kim | .................. G02F 1/136259 349/38 |
| 2014/0152640 A1* | 6/2014 | Chen | ...................... G09G 3/003 349/15 |

FOREIGN PATENT DOCUMENTS

| | | |
|---|---|---|
| CN | 202631905 | 12/2012 |
| CN | 202886789 | 4/2013 |

\* cited by examiner

LIQUID CRYSTAL SCREEN AND DISPLAY DEVICE

RELATED APPLICATIONS

The present application is the U.S. national phase entry of PCT/CN2015/084357, with an international filing date of Jul. 17, 2015, which claims the benefit of Chinese Patent Application No. 201520126781.9, filed on Mar. 4, 2015, the entire disclosures of which are incorporated herein by reference.

TECHNICAL FIELD

The present invention relates to the technical field of display, specifically to a liquid crystal screen and a display device.

BACKGROUND OF THE INVENTION

Liquid crystal display technology is widely applied to such fields as television, mobile phone and public information display, etc., which have very strict requirement on visual angle. Therefore, the wide angle of view technology has become an important technology in liquid crystal display technology.

The inventive concept of the present disclosure is that, in the wide angle of view display technology, the electric fields of adjacent sub-pixel electrodes generate interference to each other, which results in that the alignment of liquid crystal molecules deviates from a predetermined orientation, thus causing light leakage.

SUMMARY OF THE INVENTION

To address the problem of light leakage caused by electric fields between adjacent sub-pixel electrodes in the existing liquid crystal screen, the present invention provides a liquid crystal screen that can effectively prevent said light leakage and that has optimized display effect.

The technical solution adopted for solving the technical problem of the present invention is to provide a liquid crystal screen, which comprises a first substrate and a second substrate, the first substrate comprising first leads and second leads that cross each other, the liquid crystal screen comprising a plurality of display areas, each display area corresponding to an area between two adjacent first leads and two adjacent second leads, and each display area comprising two sub-pixels, with each sub-pixel having a sub-pixel electrode arranged therein;

said liquid crystal screen further comprises a black matrix, which has a plurality of openings, each opening at a position corresponding to each display area, and said black matrix further comprises protrusions extending into each opening, said protrusions corresponding to a gap between the two sub-pixel electrodes in each display area.

In one embodiment, the two sub-pixel electrodes in each display areas are arranged along a direction of the length of the first leads. Said protrusions comprise first protrusions arranged on two sides of each opening of the black matrix, which are parallel to the direction of the length of the first lead.

In one embodiment, the central line of the first protrusions coincides with the central line of the gap between the two sub-pixel electrodes.

In one embodiment, the first protrusions cover apexes of the two sub-pixel electrodes, which are located on the sides next to the gap between the two sub-pixel electrodes.

In one embodiment, the sub-pixel electrodes are fine slit electrodes, which comprise a first rootstock, a second rootstock and a branch, wherein the first rootstock is parallel to a direction of the length of the second leads, and the second rootstock is parallel to a direction of length of the first leads.

In one embodiment, the protrusions comprise second protrusions arranged at endpoints of the first rootstock and/or the second rootstock of each fine slit electrode.

In one embodiment, the endpoints of the first rootstock are close to the first leads; the endpoints of the second rootstock are close to the second leads and far away from the gap between the two sub-pixel electrodes.

In one embodiment, the central line of the second protrusions coincides with the central line of the first rootstock and/or the second rootstock.

In one embodiment, the sub-pixel electrodes extend outside of each display area.

In one embodiment, the sub-pixel electrodes overlap with the first leads and/or the second leads.

In one embodiment, the protrusions have a shape of a symmetrical triangle or semicircle.

In one embodiment, two of the first leads are arranged between two display areas that are adjacent to each other in a direction of the length of the second leads, and one of the second leads is arranged between two display areas that are adjacent to each other in a direction of the length of the first leads.

In one embodiment, two sub-pixels arranged on both sides of each second lead and opposite to each other form a pixel unit.

In one embodiment, the black matrix is arranged on the second substrate.

In one embodiment, the first leads are data lines, and the second leads are gate lines; or the first leads are gate lines, and the second leads are data lines.

As an alternative technical solution, the present invention further provides a display device, comprising any one of the above-mentioned liquid crystal screens.

In the liquid crystal screen according to the present invention, protrusions are provided on the black matrix, which extend into each opening. Said protrusions can prevent light leakage, especially the light leakage caused by the electric field between adjacent sub-pixel electrodes in the liquid crystal screen, as long as they are arranged in appropriate positions, thus the contrast and display effect of the liquid crystal screen can be improved.

Meanwhile, the rootstocks and branch of the fine slit electrodes have different electric field directions, so liquid crystal molecules corresponding to the rootstocks and the branch will have different orientations, and light leakage will occur at the endpoints of the rootstocks. The liquid crystal screen according to the present invention can effectively prevent the light leakage at the endpoints of the rootstocks of the fine slit electrode.

In the liquid crystal screen according to the present invention, the black matrix is only arranged at places where the electric field is not uniform. Such a way of arrangement can increase opening rate, thereby increasing brightness of the liquid crystal screen.

The present invention further provides a display device, which is applicable to such display fields as liquid crystal television, outdoor liquid crystal display screen, etc.

For all of the figures, the following reference signs will be used:

D: data line; G: gate line; 1: display area; 11: sub-pixel electrode; 11a: first rootstock; 11b: second rootstock; 11c: branch; 11d: slit; 2: black matrix; 21: opening; 221: first protrusion; 222: second protrusion; PA: sub-pixel electrode; PB: sub-pixel electrode; T1: thin film transistor; T2: thin film transistor.

DETAILED DESCRIPTION OF THE INVENTION

To enable those skilled in the art to better understand the technical solution of the present invention, the present invention will be described in further detail in conjunction with figures and embodiments.

Embodiment 1

As shown in FIGS. 1-5, this embodiment provides a liquid crystal screen, comprising a first substrate and a second substrate, the first substrate and the second substrate are attached together, with a liquid crystal layer between the first and second substrate.

The first substrate further comprises first leads and second leads.

As one way of this embodiment, the first leads are data lines D, and the second leads are gate lines G, and the following description is based on this example. Of course, it shall be understood that it is also feasible that the first leads are gate lines G and the second leads are data lines D.

Figure 1:
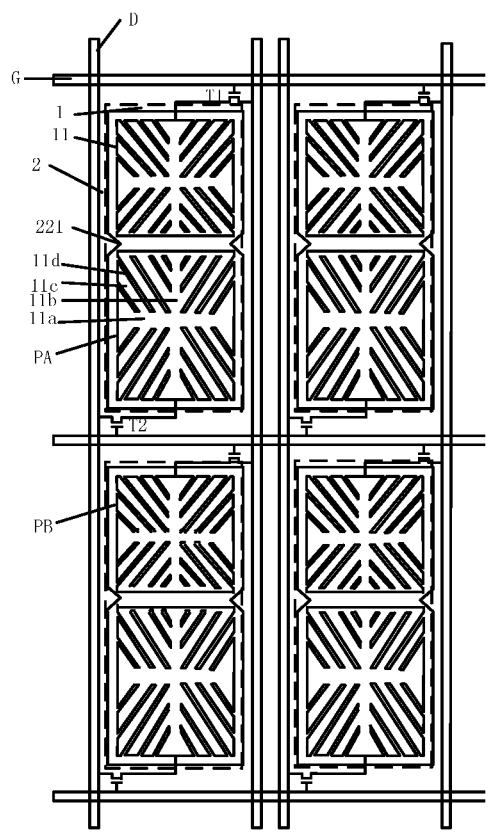
FIG. 1 is a top view of a liquid crystal screen according to embodiment 1 of the present invention.

It can be seen from FIG. 1 that in the first substrate, the gate lines G and data lines D are arranged crossing each other. The liquid crystal screen further comprises a plurality of display areas 1 for displaying, each display area 1 being located in an area between two adjacent gate lines G and two adjacent data lines D. Each display area 1 includes two sub-pixels. Each sub-pixel has a sub-pixel electrode 11 that is controlled by a gate line G and a data line D and is preferably located in the first substrate.

As shown in FIG. 1, the liquid crystal screen in this embodiment takes the form of double data lines D, namely, two data lines D are provided between two display areas 1 that are adjacent to each other laterally (i.e. along a direction of the length of the gate lines G), and one gate line G is provided between two display areas 1 that are adjacent to each other longitudinally (i.e. along a direction of the length of the data lines D). In other words, a display area 1 is provided between any two gate lines G, while the data lines are arranged with every two of them forming a group, and a display area 1 is provided between two groups of data lines D. It can be seen that in that case, the sub-pixel electrodes 11 of the two sub-pixels in the same display area 1 can be controlled independently. For example, as shown in FIG. 1, the sub-pixel electrode 11 of the upper sub-pixel in each display area 1 is controlled by the gate line G above it and the data line D to its right side, while the sub-pixel electrode PA of the lower sub-pixel is controlled by the gate line G under it and the data line D to its left side. For example, when the thin film transistor T1 is turned on by the gate line G above the sub-pixel electrode 11, the sub-pixel electrode 11 is controlled to display by the data line D to its right side. When the thin film transistor T2 is turned on by the gate line G under the sub-pixel electrode PA, the sub-pixel electrode PA is controlled to display by the data line D to its left side. On the contrary, when the thin film transistor is not turned on by the gate line G, the corresponding sub-pixel electrode does not display anything. The above structure is a design commonly used for realizing a high-resolution display, and in this design, the two sub-pixel electrodes in the same display area are controlled separately, so the signals provided to the sub-pixel electrodes 11 and PA are different, as a result, the electric fields generated by the two adjacent sub-pixel electrodes might be much more different.

Obviously, the liquid crystal screen should also comprise a common electrode (not shown in the figure). Preferably the common electrode is provided on the second substrate.

Figure 2:
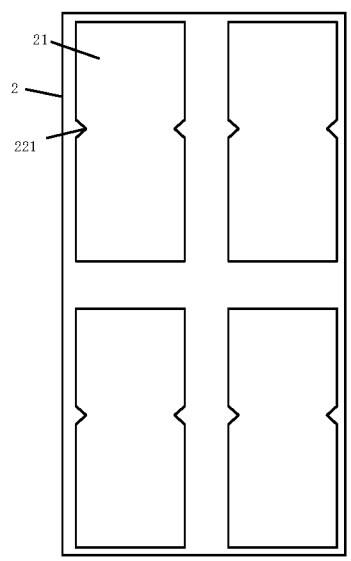
FIG. 2 is a top view of a black matrix of the liquid crystal screen according to embodiment 1 of the present invention.

As shown in FIG. 2, the liquid crystal screen further comprises a black matrix 2 for blocking positions of the gate lines G, the data lines D, etc., and an opening 21 is provided at a position corresponding to each display area 1 to allow passage of light.

Preferably, the black matrix 2 is provided in the second substrate; namely, the black matrix 2 is arranged on a different substrate from the gate lines G and the data lines D, thus it can be easily arranged. A color filter film can be disposed on the second substrate or on the first substrate.

Referring now to FIG. 1, in this embodiment, the black matrix 2 further comprises protrusions extending into each opening 21, said protrusions corresponding to a gap between the two sub-pixel electrodes in each display area 1.

As mentioned previously, two sub-pixel electrodes are provided in each display area 1, so light leakage might occur between the two sub-pixel electrodes. In this embodiment, however, the black matrix 2 further comprises protrusions corresponding to the gap between the two sub-pixel electrodes in each display area 1, which can shield the positions that might leak light in the display area 1, thereby increasing the contrast of the liquid crystal screen and improving display effect.

The two sub-pixel electrodes in each display area 1 are arranged along a direction of the length of the data lines D. The protrusions of the black matrix 2 comprise first protrusions 221, which are arranged on two sides of each opening 21 of the black matrix 2, which are parallel to the direction of the length of the data lines D, and are corresponding to the location of the gap between the sub-pixel electrodes of two adjacent sub-pixels in the same display area. The first protrusions 221 may have a shape of symmetrical triangles or semicircles. The central line of the first protrusions 221 coincides with the central line of the gap between the two sub-pixels.

With respect to the liquid crystal screen in the present embodiment, two sub-pixel electrodes in each display area 1 are arranged along a direction of the length of the data lines D (the vertical direction in the figure). First protrusions 221 are provided at two sides (left and right sides) of each opening 21 of the black matrix 2, and said first protrusions 221 are arranged at a location of the gap between two adjacent sub-pixel electrodes, thus shielding light leakage between the adjacent sub-pixel electrodes, and increasing the contrast of the liquid crystal screen, as a result, the display effect is improved.

The first protrusions 221 may also cover apexes of the two sub-pixel electrodes, which are located on the sides next to the gap between the two sub-pixel electrodes.

Figure 3:
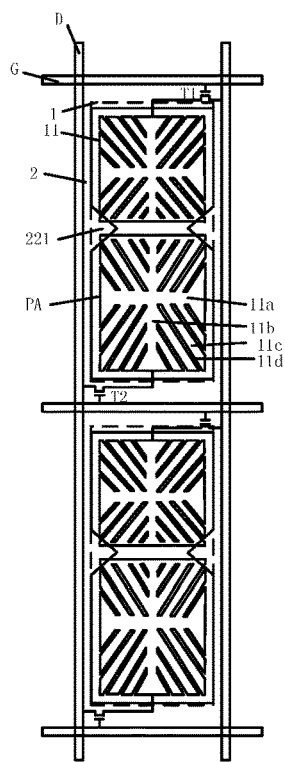
FIG. 3 is a top view of another preferred implementation of the liquid crystal screen according to embodiment 1 of the present invention.

Referring to FIG. 3, the first protrusions 221 cover apexes of the sub-pixel electrode 11 and the sub-pixel electrode PA, which are located on the sides next to the gap between the two sub-pixel electrodes 11 and PA. The electric fields of the apexes at the same side of the two sub-pixel electrodes (parallel to the direction of the length of the data lines), which are located on the sides next to the gap between the two sub-pixel electrodes 11 and PA are most different from the electric fields of other places, which will result in different orientations of the liquid crystal molecules in the corresponding area, thus easily causing light leakage. Therefore, by making the first protrusions 221 to cover apexes of the two sub-pixels, which are located on the sides next to the gap between the two sub-pixel electrodes 11 and PA, light leakage from said positions can be effectively prevented, thereby improving display effect.

Figure 4:
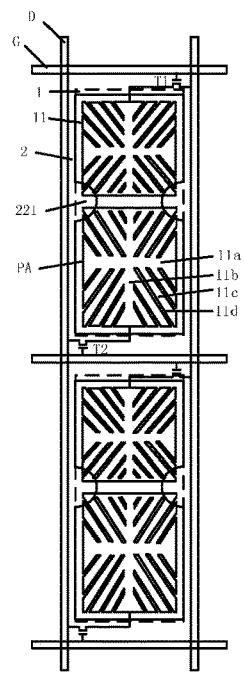
FIG. 4 is a top view of another preferred implementation of the liquid crystal screen according to embodiment 1 of the present invention.

The first protrusions 221 can have a shape of triangles as shown in FIG. 1, or it can have a shape of semicircles as shown in FIG. 4. Alternatively, the first protrusions 221 can have a shape of square, trapezoid, etc., which will not be elaborated herein.

The sub-pixel electrode 11 is a fine slit electrode, which comprises a first rootstock, a second rootstock and a branch. The first rootstock is parallel to the direction of the length of the gate lines G, and the second rootstock is parallel to the direction of the length of the data lines D. The black matrix 2 may further comprises second protrusions 222, which are arranged at endpoints of the first rootstock and/or the second rootstock of each fine slit electrode. The endpoints of the first rootstock are close to data lines D, the endpoints of the second rootstock are close to the gate lines G and far away from the gap between the two sub-pixel electrodes 11 and PA.

Figure 5:
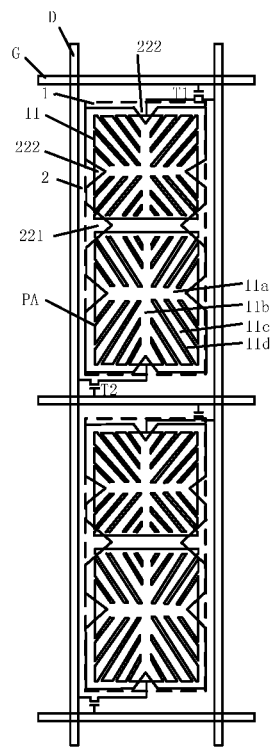
FIG. 5 is a top view of another preferred implementation of the liquid crystal screen according to embodiment 1 of the present invention.

Polymer Stabilized Vertical Alignment (PSVA) is one of the important forms in the wide angle of view display technology. In this form, the sub-pixel electrode 11 is usually a fine slit electrode and has a plurality of slits 11*d* arranged therein. As shown in FIG. 5, the slits 11*d* are usually divided into multiple groups, each group comprising a plurality of parallel slits 11*d*. The strip electrodes between the slits 11*d* are called branches 11*c*. The "roots" of each group of branches 11*c* are gathered together, and the position of gathering is called "rootstock". For example, in FIG. 5, each slit electrode comprises a first rootstock 11*a* and a second rootstock 11*b* perpendicular to each another, the first rootstock 11*a* is parallel to the direction of the length of the gate lines G, and the second rootstock 11*b* is parallel to the direction of the length of the data lines D, and the two rootstocks cross to form a shape of "+".

When the sub-pixel electrode is a fine slit electrode, the protrusions may further comprise second protrusions 222. That is, as shown in FIG. 5, the second protrusions 222 are arranged at the endpoints of the first rootstock 11*a* and/or the second rootstock 11*b* of each fine slit electrode. The endpoints of the first rootstock 11*a* are close to the data lines D; the endpoints of the second rootstock 11*b* are close to the gate lines G and far away from the gap between the two sub-pixel electrodes 11 and PA. Since the electric fields of the first rootstock, the second rootstock and the branch of the fine slit electrode have different directions, the liquid crystal molecules corresponding to the first rootstock, the second rootstock and the branch will have different orientations, thus light leakage will occur at the endpoints of the first rootstock close to the data lines D and at the endpoints of the second rootstock close to the gate lines G and far away from the gap between two adjacent sub-pixel electrodes. The second protrusions 222 can effectively shield light leakage at the endpoints of the first rootstock of the slit electrode close to the data lines D and/or at the endpoints of the second rootstock of the slit electrode close to the gate lines G and far away from the gap between two adjacent sub-pixel electrodes.

The central line of the second protrusions 222 may coincide with the central line of the first rootstock 11*a* or the second rootstock 11*b*. The second protrusions 222 can have a shape of triangle, semicircle, or square, trapezoid, etc., which will not be elaborated herein.

Two sub-pixels arranged at the two sides of each gate line G and opposite to each other can form a pixel unit. For instance, the sub-pixel electrode PA and sub-pixel electrode PB arranged at the two sides of the gate line G as shown in FIG. 1 form a pixel unit.

The liquid crystal display screen according to the present embodiment can effectively prevent light leakage caused by non-uniformity of the electric field of the sub-pixel electrode (including electric field between adjacent sub-pixel electrodes, and electric fields of the first rootstock, the second rootstock and the branch of the fine slit electrode), because the black matrix 2 has protrusions which are arranged only at places where the electric field is not uniform. Such a way of arrangement can increase the opening rate, thereby increasing brightness of the liquid crystal screen.

Embodiment 2

This embodiment provides a liquid crystal screen, which has a structure similar to that of the liquid crystal screen of embodiment 1. The difference lies in that in the present embodiment, each sub-pixel electrode extends outside of the display area 1 so as to partially overlap with the black matrix 2.

Figure 6:
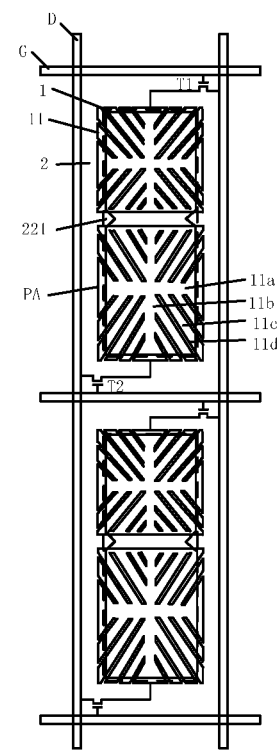
FIG. 6 is a top view of a liquid crystal screen according to embodiment 2 of the present invention.

As shown in FIG. 6, as a common mode for high-resolution display, each sub-pixel electrode may be beyond the display area 1. Since the black matrix 2 only has an opening at the position corresponding to each display area 1, each display area 1 can be considered as being corresponding to each opening 21 of the black matrix 2. Therefore, each sub-pixel electrode goes beyond each opening 21 of the black matrix 2, and the black matrix 2 will cover the edge of the sub-pixel electrode, namely, they are overlapping partially.

Each sub-pixel electrode may also extend outside of the display area 1 to overlap with the data lines D and/or gate lines G.

Figure 7:
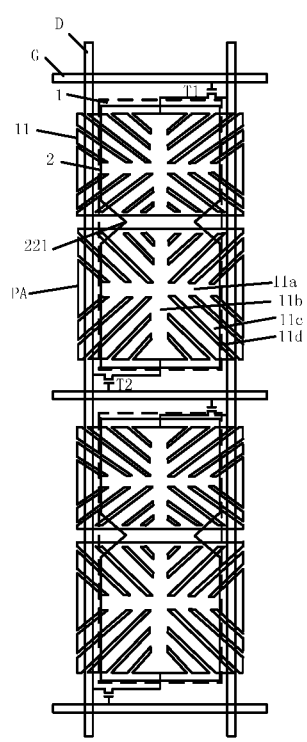
FIG. 7 is a top view of another preferred implementation of the liquid crystal screen according to embodiment 2 of the present invention.

As shown in FIG. 7, each sub-pixel electrode may be beyond the display area 1 and extend all along to be above the data lines D. Since the gate lines G and data lines D are already covered by the black matrix 2, the sub-pixel electrode overlaps with the black matrix 2. Likewise, each sub-pixel electrode may be beyond the display area 1 and extend all along to be above the gate lines G (not shown in the figure).

As described above, the black matrix 2 only has an opening at a position corresponding to each display area 1, so the black matrix 2 will cover the edge of each sub-pixel electrode.

Generally speaking, the edge electric field effect of the sub-pixel electrode will cause the alignment of the liquid crystal molecules to deviate from a predetermined orientation, thus causing light leakage. The black matrix 2 covers the edge of the sub-pixel electrode, so the light leakage caused by the electric field between adjacent sub-pixel electrodes can be effectively prevented, meanwhile, the opening rate can be increased, thereby increasing brightness of the liquid crystal screen.

Embodiment 3

This embodiment provides a display device, comprising the liquid crystal screen of embodiment 1 or 2.

The display device provided in this embodiment is applicable to such display fields as liquid crystal television, outdoor liquid crystal display screen, etc. By using the above-mentioned liquid crystal screen, it can effectively prevent light leakage caused by the electric field between adjacent sub-pixel electrodes, meanwhile, it can increase brightness of the liquid crystal screen so as to optimize the display effect thereof.

It shall be understood that the above embodiments are merely exemplary embodiments for explaining the principle of the present invention, while the present invention is not limited to these embodiments. To those skilled in the art, various changes and improvements can be made without departing from the spirit and substance of the present invention, so these changes and improvements should fall into the scope and protection of the claims of the present invention.

The invention claimed is:

1. A liquid crystal screen, which comprises a first substrate and a second substrate, the first substrate comprising first leads and second leads that cross each other, the liquid crystal screen comprising a plurality of display areas, each display area corresponding to an area between two adjacent first leads and two adjacent second leads, and each display area comprising a first sub-pixel and a second sub-pixel;
wherein the first sub-pixel comprises a first sub-pixel electrode coupled to a first thin film transistor, the second sub-pixel comprises a second sub-pixel electrode coupled to a second thin film transistor, the first sub-pixel electrode and the second sub-pixel electrode are arranged along a direction of the length of the first leads and separated by a gap between the first sub-pixel electrode and the second sub-pixel electrode in each display area;
wherein said liquid crystal screen further comprises a black matrix, which has a plurality of openings, each opening at a position corresponding to each display area, and said black matrix further comprises a plurality of first protrusions extending into each opening, each of the plurality of first protrusions is adjacent to the gap between the first sub-pixel electrode and the second sub-pixel electrode in each display area.

2. The liquid crystal screen according to claim 1, wherein the central line of each of the plurality of first protrusions coincides with the central line of the gap between the first sub-pixel electrode and the second sub-pixel electrode.

3. The liquid crystal screen according to claim 1, wherein the first protrusions cover apexes of the two sub-pixel electrodes, which are located on the sides next to the gap between the two sub-pixel electrodes.

4. The liquid crystal screen according to claim 1, wherein the protrusions comprise a plurality of second protrusions arranged at endpoints of at least one of the first rootstock and the second rootstock of each fine slit electrode.

5. The liquid crystal screen according to claim 4, wherein the endpoints of the first rootstock are close to the first leads; and the endpoints of the second rootstock are close to the second leads and far away from the gap between the two sub-pixel electrodes.

6. The liquid crystal screen according to claim 4, wherein the central line of the second protrusions coincides with the central line of at least one of the first rootstock and the second rootstock.

7. The liquid crystal screen according to claim 1, wherein the sub-pixel electrodes extend outside of each display area.

8. The liquid crystal screen according to claim 7, wherein the sub-pixel electrodes overlap with at least one of the first leads and the second leads.

9. The liquid crystal screen according to claim 1, wherein the protrusions have a shape of triangle or semicircle.

10. The liquid crystal screen according to claim 1, wherein two of the first leads are arranged between two display areas that are adjacent to each other in a direction of the length of the second leads, and one of the second leads is arranged between two display areas that are adjacent to each other in a direction of the length of the first leads.

11. The liquid crystal screen according to claim 1, wherein the two sub-pixels arranged on both sides of each second lead and opposite to each other form a pixel unit.

12. The liquid crystal screen according to claim 1, wherein the black matrix is arranged on the second substrate.

13. The liquid crystal screen according to claim 1, wherein
the first leads are data lines, and the second leads are gate lines; or wherein
the first leads are gate lines, and the second leads are data lines.

14. A display device, comprising the liquid crystal screen according to claim 1.

15. The display device according to claim 14, wherein the sub-pixel electrodes extend outside of each display area.

16. The display device according to claim 14, wherein two of the first leads are arranged between two display areas that are adjacent to each other in a direction of the length of the second leads, and one of the second leads is arranged between two display areas that are adjacent to each other in a direction of the length of the first leads.

17. The display device according to claim 14, wherein the sub-pixel electrodes are fine slit electrodes, which comprise a first rootstock, a second rootstock and a branch, wherein the first rootstock is parallel to a direction of the length of the second leads, wherein and the second rootstock is parallel to a direction of length of the first leads.

18. The liquid crystal screen according to claim 1, wherein each sub-pixel electrode is a fine slit electrode, which comprises a first rootstock, a second rootstock and a branch, wherein the first rootstock is parallel to a direction of the length of the second leads, and the second rootstock is parallel to a direction of length of the first leads.

* * * * *